United States Patent
Seto

(10) Patent No.: US 10,488,981 B2
(45) Date of Patent: Nov. 26, 2019

(54) SYSTEM AND METHOD OF MEASURING CONTINUOUS TOUCH CONTROLLER LATENCY

(71) Applicant: Samsung Display Co., Ltd., Yongin, Gyeonggi-Do (KR)

(72) Inventor: Frank C. Seto, San Jose, CA (US)

(73) Assignee: SAMSUNG DISPLAY CO., LTD. (KR)

( * ) Notice: Subject to any disclaimer, the term of this patent is extended or adjusted under 35 U.S.C. 154(b) by 406 days.

(21) Appl. No.: 14/863,323

(22) Filed: Sep. 23, 2015

(65) Prior Publication Data

US 2016/0147363 A1     May 26, 2016

Related U.S. Application Data

(60) Provisional application No. 62/085,069, filed on Nov. 26, 2014.

(51) Int. Cl.
    *G06F 3/041*          (2006.01)
    *G06F 11/30*        (2006.01)

(52) U.S. Cl.
    CPC .................................. *G06F 3/0418* (2013.01)

(58) Field of Classification Search
None
See application file for complete search history.

(56) References Cited

U.S. PATENT DOCUMENTS

| | | | |
|---|---|---|---|
| 8,717,443 B2 | 5/2014 | Kaehler et al. | |
| 8,914,254 B2 | 12/2014 | Uzelac et al. | |
| 2010/0156656 A1* | 6/2010 | Duarte | G06F 3/04886 340/815.4 |
| 2012/0146956 A1 | 6/2012 | Jenkinson | |
| 2014/0152584 A1 | 6/2014 | Matthews et al. | |
| 2015/0062021 A1* | 3/2015 | Skaljak | G06F 3/04883 345/173 |
| 2016/0004375 A1* | 1/2016 | Xiong | G06F 3/0418 345/173 |
| 2016/0139794 A1* | 5/2016 | Hammendorp | G06F 3/04883 715/716 |
| 2016/0188088 A1* | 6/2016 | Rodrigues De Araujo | G06F 3/0416 345/173 |

* cited by examiner

*Primary Examiner* — William Boddie
*Assistant Examiner* — Alecia D English
(74) *Attorney, Agent, or Firm* — Innovation Counsel LLP

(57) ABSTRACT

A system and method of measuring the continuous latency of a touch controller is presented. According to an exemplary embodiment, the method includes generating a detection signal in response to detecting touch reports from the touch controller indicating a change in input direction; capturing a sequence of image frames, each image frame depicting a contact point on the touch screen display and indicating a state of a detection signal; and determining a difference between a time $t_0$ when an actual change in input direction occurred and a time $t_1$ when the detection signal is generated, based on the image frames.

20 Claims, 8 Drawing Sheets

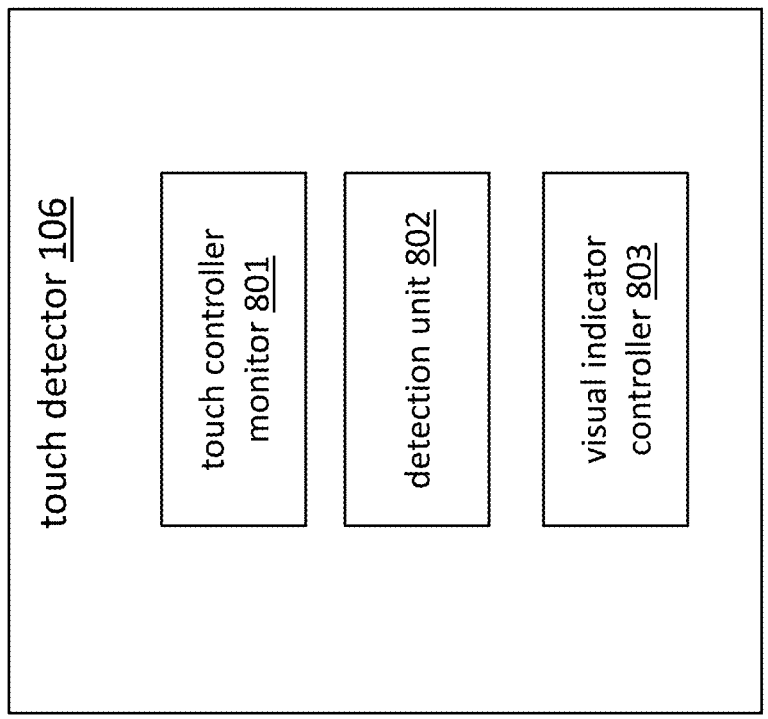

SYSTEM AND METHOD OF MEASURING CONTINUOUS TOUCH CONTROLLER LATENCY

CROSS-REFERENCE TO RELATED APPLICATION(S)

This application claims priority to and the benefit of U.S. Provisional Patent Application No. 62/085,069 titled "MEASUREMENT OF CONTINUOUS TOUCH CONTROLLER LATENCY" and filed on Nov. 26, 2014, the entire content of which is incorporated herein by reference.

RELATED FIELD

The present disclosure relates in general to measurement of touch controller latency, and in particular, to a system and method of measuring continuous touch controller latency.

BACKGROUND

A touch input system, as the name suggests, senses contact as an input. The contact may be a physical touch (i.e., physical contact) or a proximate touch (i.e., no physical contact, such as hovering). A touch input system may include a touch screen display and a touch controller. The touch screen display may include a display layer configured to display information and a sensing layer configured to sense a touch input on the touch screen display, for example, using one or more of a resistive, capacitive and surface wave sensing technology. The sensing layer may include a plurality of sensors connected to the touch controller.

The touch controller is generally responsible for detecting touch events on the basis of signals received from the touch screen display and reporting those touch events as touch reports to a host. A touch report may include the location of the touch event (e.g., X, Y coordinates), pressure, touch gestures, and/or other attributes output by the touch controller. A criteria for evaluating the touch controller is its latency, which generally refers to the delay between a touch input on the touch screen display and when a corresponding touch event is reported to the host via electrical signals as a touch report.

The touch controller latency may be measured as an initial latency (also known as "touch-down latency") or a continuous latency (also known as "panning latency"). Initial latency is measured from the time when a first touch input occurs to when a corresponding touch event is detected. Thus, the measured initial latency may include a wakeup time of the touch controller. Continuous latency, on the other hand, measures the ongoing time it takes the touch controller to process subsequent touch inputs after the first touch input. That is, the measured continuous latency represents how responsive the touch controller is to changing touch inputs.

Determining the continuous latency of a touch controller is important because it impacts the overall responsiveness of a device in which the touch input system is incorporated. However, manufacturers of touch controllers generally do not specify the touch controller latency. Furthermore, measuring continuous latency is challenging because it is often difficult to correlate a specific touch input to a corresponding touch report issued by the touch controller. As such, there exists a need for a system and method of measuring continuous touch controller latency that overcome these problems.

SUMMARY

In one aspect, the present disclosure provides a method of measuring the continuous latency of a touch controller connected to a touch screen display. The method includes generating a detection signal in response to detecting touch reports from the touch controller indicating a change in input direction; capturing a sequence of image frames, each image frame depicting a contact point on the touch screen display and indicating a state of the detection signal; and determining a difference between a time $t_0$ when an actual change in input direction occurred and a time $t_1$ when the detection signal is generated, based on the image frames.

In another aspect, the present disclosure provides an apparatus for measuring the continuous latency of a touch controller connected to a touch screen display. The apparatus includes a touch detector unit coupled to the touch controller and configured to generate a detection signal in response to touch reports that are output by the touch controller, wherein the touch reports indicate a change in input direction of a contact point on the touch screen display; and a measurement unit determining a difference between a time $t_0$ when an actual change in input direction occurred and a time $t_1$ when the detection signal is generated.

In yet another aspect, the present disclosure provides a method of measuring the continuous latency of a touch controller connected to a touch screen display. The method includes generating a detection signal in response to receiving touch reports from the touch controller indicating a change in input direction; capturing a sequence of image frames, each image frame including position of a contact point on the touch screen display and indicating a state of the detection signal; and counting the number of frames between a first frame depicting change in the position of a contact point and a second frame indicating an updated state of the detection signal

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

FIG. 2B illustrates a block diagram of a touch detector, according to an exemplary embodiment of the present system and method.

Figure 1:
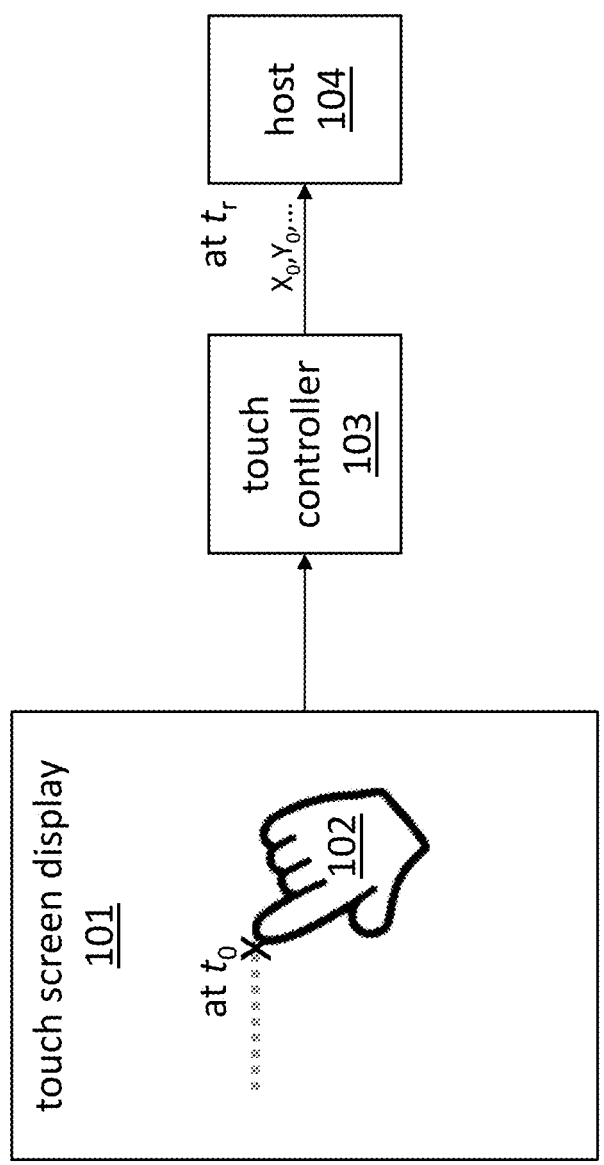
FIG. 1 illustrates an example of the continuous latency of a touch controller.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide a system and method of measuring continuous touch controller latency. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As mentioned earlier, continuous latency is measured from the time $t_0$ at which an actual touch input occurs (i.e., after an initial touch input) and the time $t_r$ at which the touch controller issues a touch report corresponding to the subsequent touch input. To illustrate, FIG. 1 shows an example of the continuous latency of a touch controller 103. As an input device 102 (e.g, a user's finger and a stylus pen) traces a path of a contact point (shown as a dotted line) across a touch screen display 101, the touch display screen 101 senses the touch input path and generates sensing signals. A "contact point," as used herein, is used to indicate any point of input as recognized by the touch screen display 101 and does not necessarily involve a physical contact.

The touch controller 103 receives the sensing signals from the touch screen display 101 and, on the basis of the sensing signals, detects a series of touch events each corresponding to a contact point position. The touch controller 103 periodically reports each touch event as a touch report to a host 104. However, it takes some time for the touch controller 103 to detect each touch event and issue a corresponding touch report. Thus, while an actual contact at an updated position indicated by "X" occurred at time $t_0$, the touch controller does not output the corresponding touch report $(X_0, Y_0, \ldots)$ until time $t_r$. The continuous latency of the touch controller 103 may be defined as equal to $t_r - t_0$. Where the actual contact at position X is not an initial contact, the actual contact may be an actual change in the direction of movement of the contact point.

Measuring continuous latency in practice, however, is often challenging due to difficulties in correlating a specific touch input to a corresponding touch report. Exemplary embodiments of the present system and method overcome these challenges and measure continuous latency by using a touch detector unit that includes a visual indicator and using computer vision to match key events between an actual contact point movement on a touch screen display and the generation of a detection signal by the visual indicator. The visual indicator, which is shown as an LED in the exemplary embodiments, may be implemented by any indicator that has minimum reaction time between receiving the touch report at time $t_r$ and generating the detection signal at time $t_1$. In an ideal world where there is no reaction time on the part of the visual indicator, $t_r$ would be the same as $t_1$. It is also contemplated that the visual indicator may be replaced by other fast-reacting indicators that are not limited to outputting a visual detection signal.

Figure 2A:
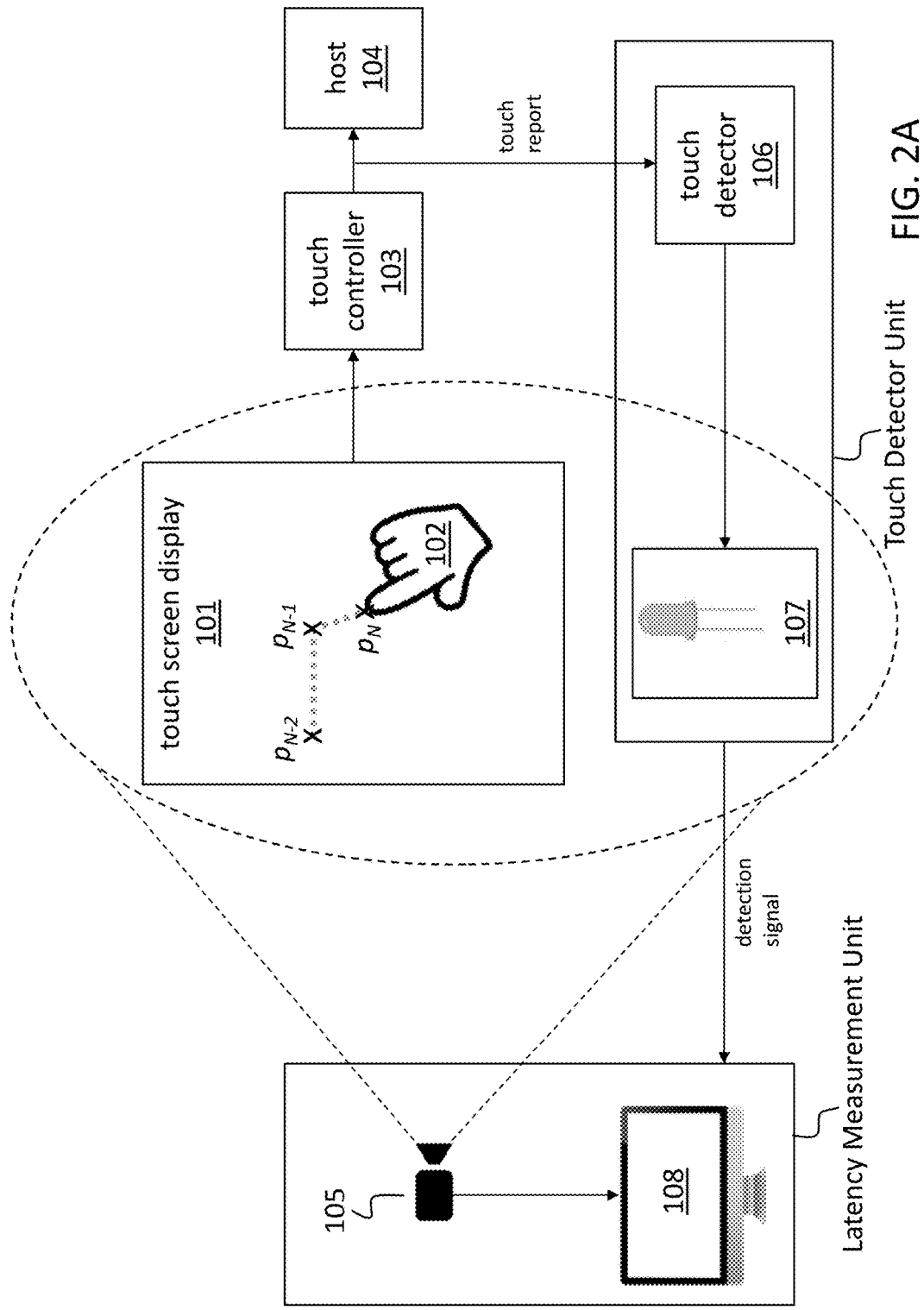
FIG. 2A illustrates an implementation of the present system and method for testing a touch input system, according to an exemplary embodiment.

FIG. 2A illustrates an implementation of the present system and method for testing a touch input system, according to an exemplary embodiment. The touch input system under test includes a touch screen display 101 and a touch controller 103. The touch input system that is being tested is coupled to a Touch Detector Unit, which receives a touch report from the touch controller 103 and generates a detection signal for the Latency Measurement Unit.

The touch controller 103 may be operatively connected to a host 104 and output touch reports thereto. The Touch Detector Unit, which includes a touch detector 106 that is operatively connected to the touch controller 103 and a visual indicator 107, listens for touch reports output by the touch controller 103 to the host 104. The touch detector 106 controls a visual state of the visual indicator 107. The touch detector 106 may change the visual state of the visual indicator 107 if the touch detector 106 determines that a certain criteria is met. For example, if the visual indicator is an LED light, the touch detector 106 may switch on the LED light when the touch detector 106 detects, on the basis of the touch reports, that there was a change in input direction (i.e., a change in the direction in which the contact point was moving).

FIG. 2B illustrates a block diagram of the touch detector 106, according to an exemplary embodiment of the present system and method. The touch detector 106 includes a touch controller monitor 801, a detector unit 802, and a visual indicator controller. The touch controller monitor monitors the output of the touch controller and listens for touch reports. The detector unit 802 analyzes the touch reports and utilizes a detection algorithm to detect a particular change in touch input, such as a directional change in the touch motion. The visual indicator controller 803 controls the visual state of the visual indicator 107 in response to detecting the particular change. According to some embodiments, the touch detector 106 may be implemented using application specific integrated circuits (ASICs), field-programmable gate arrays (FPGAs), an embedded system/controller, and the like.

Referring back to FIG. 2A, a high-speed image recorder 105 (e.g., camera/video recorder) is setup and configured to capture a sequence of image frames of the touch screen display 101 and the visual indicator 107. That is, the image recorder 105 is aimed at the touch screen display 101 and visual indicator 107 such that the position of an input device 102 making touch inputs to the touch screen display 101 and the visual indicator 107 are simultaneously visible in each image frame. In this way, each captured image frame depicts a moment in time of the position of a contact point on the touch screen display 101 and of the state of the visual indicator 107. For example, the sequence of image frames captured by the image recorder may include an (N−2)-th image frame depicting the contact point by the input device 102 at position $p_{N-2}$, an (N−1)-th image frame depicting the contact point at position $p_{N-1}$, and an N-th image frame depicting the contact point at position $p_N$. According to an exemplary embodiment, the image recorder captures the image frames at a frame rate of 1000 frames per second (fps) or greater. However, this is not a limitation of the inventive concept, which may be used with any frame rate.

The captured image frames may be stored in the image recorder and subsequently downloaded to a computer vision unit (hereinafter, "CVU" for convenience) 108 for analysis, or stored directly in and analyzed by the CVU 108 as the image frames are being captured. The CVU 108 is responsible for processing the images captured by the image recorder. Particularly, the CVU 108 analyzes the image frames to identify and correlate a change in the position of the contact point (e.g., a change in the direction of the contact point movement) and a change in the visual state of the visual indicator 107 and, on the basis of the analysis, calculates the continuous latency of the touch controller 103. The CVU 108 may also control the operations of image recorder 105. The CVU 108 and the image recorder 105 together may be referred to as a latency measurement unit.

Figure 3:
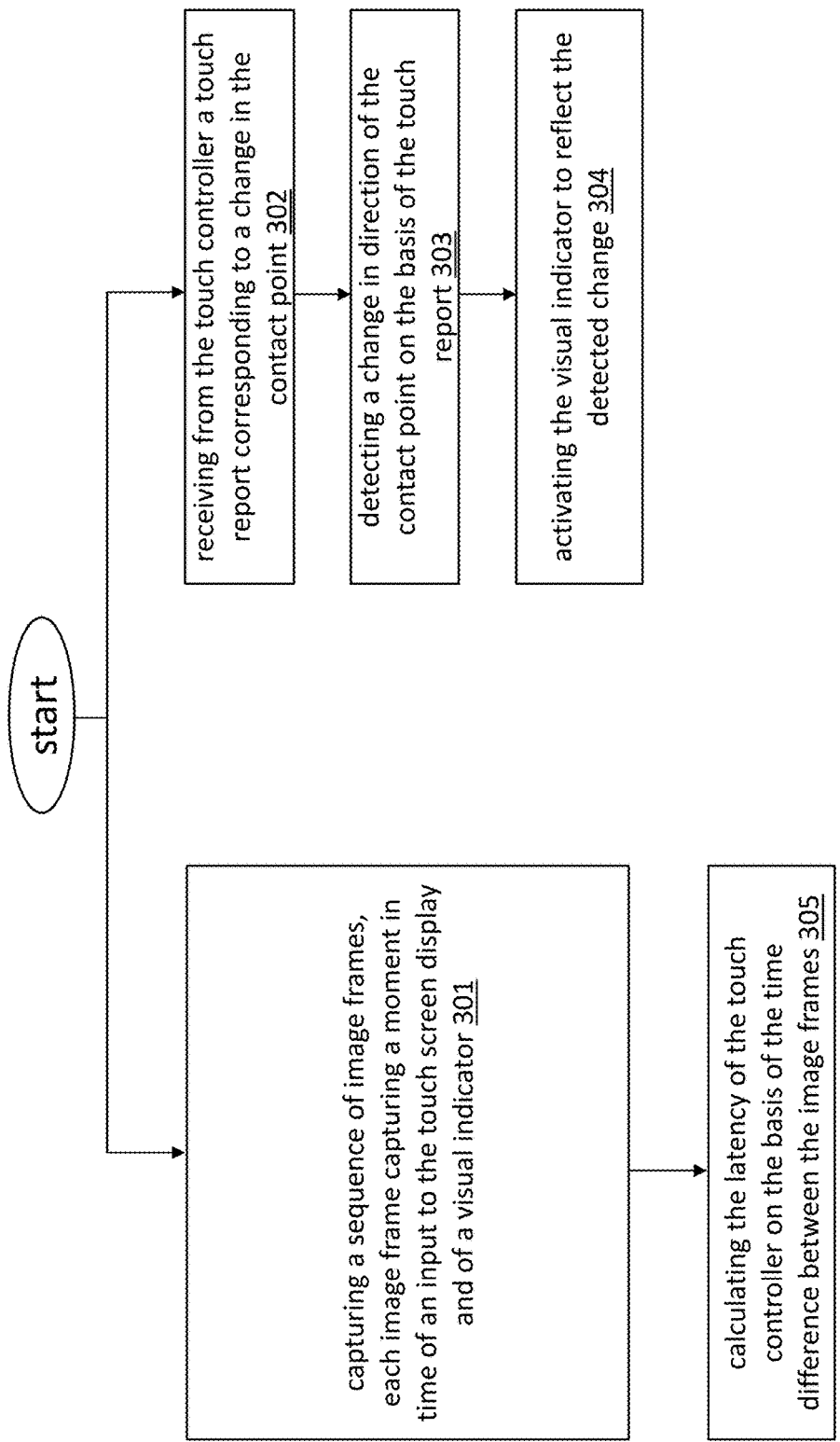
FIG. 3 illustrates a flowchart of a process for measuring the continuous latency of a touch controller, according to an exemplary embodiment of the present system and method.

FIG. 3 illustrates a flowchart of a process for measuring the continuous latency of a touch controller, according to an exemplary embodiment of the present system and method. The image recorder begins capturing a sequence of image frames of a touch screen display and a visual indicator (301). Each of the image frames may capture a moment in time of an input to the touch screen display 101 and of a visual indicator 107. While the image frames are being captured, a touch detector 106 connected to a touch controller 103 continuously listens for and analyzes touch reports from the touch controller 103. The touch controller 103 generates touch reports in response to inputs of an input device on the touch screen display 101.

The touch detector receives from the touch controller a touch report corresponding to a change in the contact point (302). If the touch detector detects a change in direction of the input on the basis of the touch report (303), the touch detector 106 updates a state of the visual indicator 107 to reflect the detected change in direction of the input (304). Thus, on the basis of its analyses of the touch report, the touch detector updates the visual indicator accordingly.

Next, the CVU calculates the continuous latency of the touch controller on the basis of the image frames (305). Calculating the continuous latency may include analyzing the image frames to identify an image frame in which the contact point actually changed direction (at time $t_0$), analyzing the image frames to identify an image frame in which the visual indicator is activated (at time $t_1$), and using the known frame rate to calculate the amount of time that elapsed between the image frame in which the contact point actually changed direction and the image frame in which the visual indicator is updated.

Figure 4:
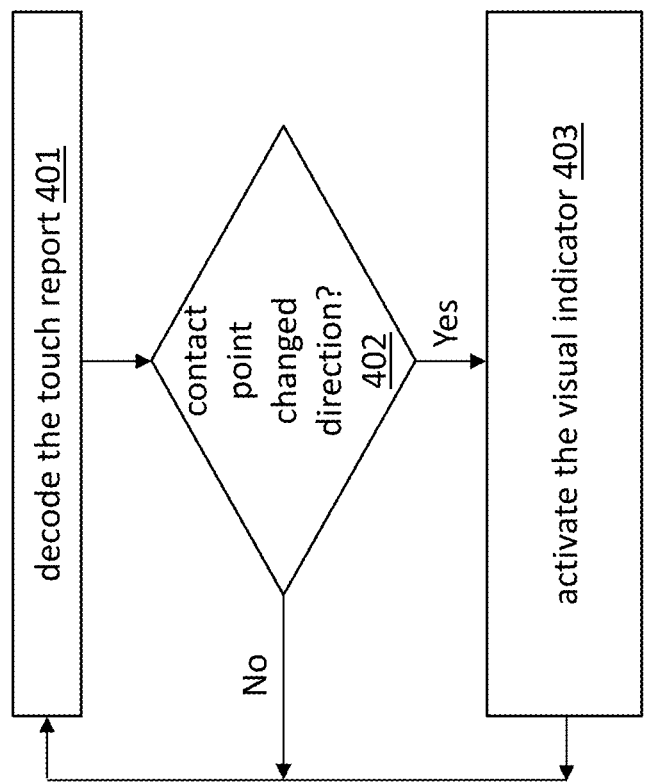
FIG. 4 illustrates a flow chart of a process performed by a touch detector, according to an exemplary embodiment of the present system and method.
Figure 5:
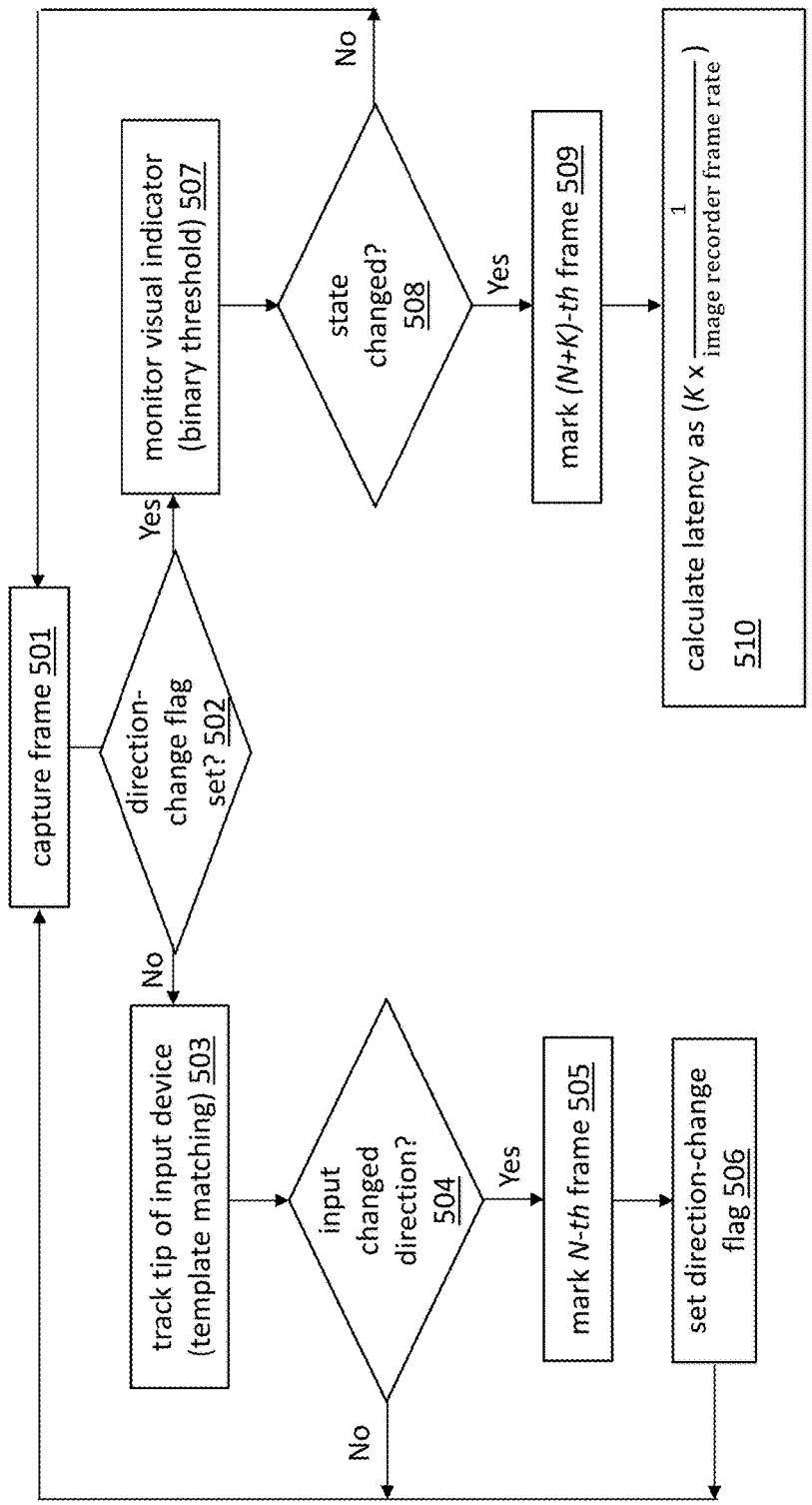
FIG. 5 illustrates a flow chart of a process performed by a computer vision unit (CVU), according to an exemplary embodiment of the present system and method.

FIGS. 4 and 5 illustrate the processes performed respectively by the touch detector 106 and the CVU 108 in further detail, according to exemplary embodiments of the present system and method. Referring to FIG. 4, the touch detector decodes the touch report received over an electrical bus connecting the touch controller and the host (401) to determine the touch location (e.g., X, Y coordinates) of the corresponding touch input. The touch detector determines whether the contact point changed direction (402). A contact point may be deemed to have changed direction if an angle formed between a directional vector corresponding to the movement of the contact point and a directional vector corresponding to an immediately preceding movement of the contact point exceeds a predetermined value (e.g., greater than 45 degrees or 90 degrees).

If the touch detector determines that the contact point did not change direction, the touch detector proceeds back to process 401 to decode the next touch report. On the other hand, if the touch detector determines that the contact point changed its direction of movement, the touch input updates a visual state of the visual indicator (403) and then proceeds back to process 401 to decode the next touch report. According to an exemplary embodiment, the processing time of the touch detector is substantially constant and less than 1/(frame rate of the image recorder).

Referring to FIG. 5, the CVU receives an image frame of the touch screen display and the visual indicator (501). The CVU determines if the direction-change flag is set or unset (502). The direction-change flag is initially in an unset state to indicate that no input direction change is detected. If the CVU determines that the direction-change flag is not set, the CVU tracks the tip of an input device to determine the position of the touch input (503).

To make identifying and tracking the tip of the input device in each image frame easier, a pattern or color marker may be used in some embodiments. The pattern or color marker does not affect touch performance, and may be included at or near the tip of the input device that is the source of the contact point, such that the marker is visible in each image frame. Doing so allows the CVU to use common tracking algorithms, such as template matching algorithms available in Open Source Computer Vision (OpenCV), to identify and subsequently track a path of the touch input in the image frame.

Figure 6:
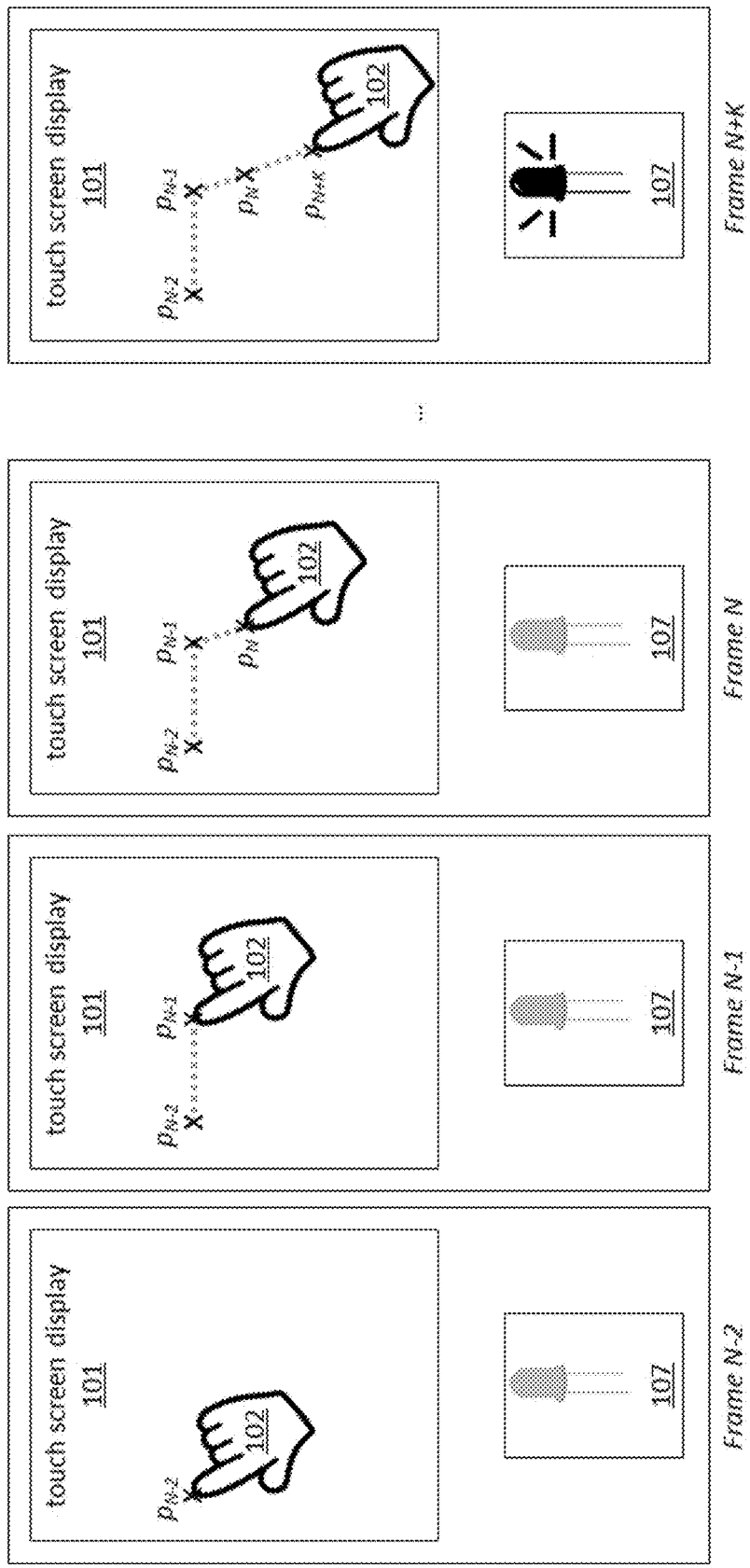
FIG. 6 illustrates an exemplary sequence of image frames captured by an image recorder and with which the continuous latency of a touch controller may be measured, according to an exemplary embodiment of the present system and method.
Figure 7:
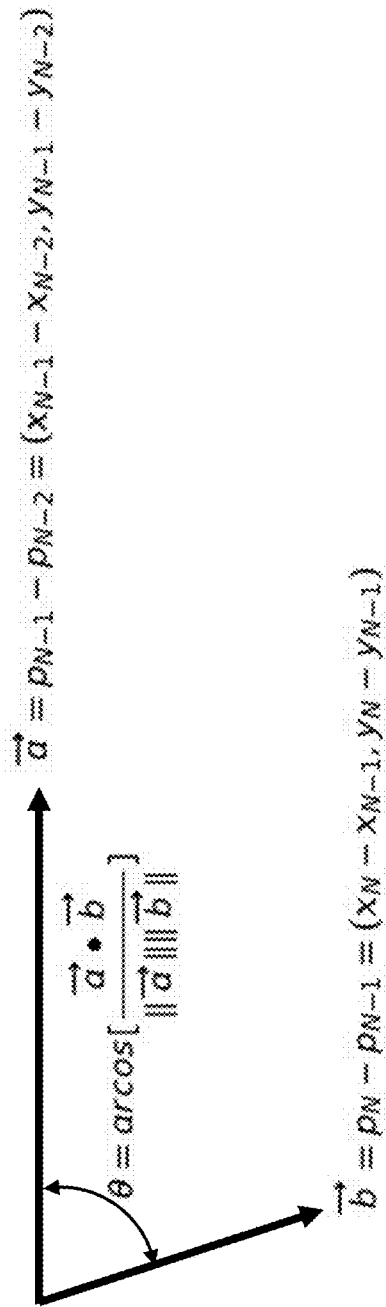
FIG. 7 illustrates an example of determining whether touch input changed direction, according to an exemplary embodiment of the present system and method.

Having identified the position of the contact point in the image frame, the CVU determines whether the contact point's direction of movement changed (504), which FIG. 6 illustrates frame-by-frame according to an exemplary embodiment. FIG. 6 shows a sequence of image frames ranging from an (N−2)-th image frame to an (N+K)-th image frame, where N and K are natural numbers. Each frame depicts a position p of a contact point by the input device 102 on the touch screen display 101. To determine whether the input changed direction in the N-th frame, the CVU may:

1. calculate a first directional vector $\vec{b}$ corresponding to a change in position of the contact point between the N-th image frame and an (N−1)-th image frame using the equation:

$\vec{b} = p_N - p_{N-1} = (x_N - x_{N-1}, y_N - y_{N-1})$, wherein $x$ and $y$ are position coordinates of $p$, 2. calculate a second directional vector $\vec{a}$ corresponding to a change in position of the contact point between the (N−1)-th image frame and the (N−2)-th image frame using the equation:

$\vec{a} = p_{N-1} - p_{N-2} = (x_{N-1} - x_{N-2}, y_{N-1} - y_{N-2})$, 3. calculate an angle θ formed by the first and second directional vectors using the equation:

$$\theta = arcos\left[\frac{\vec{a} \cdot \vec{b}}{\|\vec{a}\|\|\vec{b}\|}\right]$$ (See FIG. 7 for an illustration)

4. compare θ to a predetermined threshold value, and
5. identify the N-th frame as the image frame in which the input changed direction if θ exceeds the predetermined threshold value (e.g., greater than 45 degrees or 90 degrees).

Thus, by keeping track of the previous touch locations, the CVU is able to detect a change in direction of the contact point on the touch screen display. After determining that the input changed direction in the N-th frame, the CVU marks or notes the N-th image frame (505), sets the direction-change flag (506), and proceeds back to process 501 to receive the next image frame.

After receiving the next image frame, the CVU again checks whether the direction-change flag is set or unset (502). Because the direction-change flag was set at process 506, indicating that contact point changed direction in the N-th image frame, the CVU proceeds to monitor the visual state of the visual indicator (507). Monitoring the change in the visual state of the visual indicator may be performed using a binary threshold algorithm over the area of the image frame where the visual indicator is depicted.

If the CVU determines that the state of the visual indicator in the current image frame did not change from that of the immediately preceding image frame (508), the CVU proceeds back to process 501 to receive the next image frame. That is, the CVU keeps monitoring the visual indicator in each subsequent image frame until the (N+K)-th image frame in which the state of the visual indicator is changed from that of the immediately preceding image frame (i.e., the (N+K−1)-th image frame).

The CVU marks or notes the (N+K)-th image frame as the image frame in which the visual state of the visual indicator is changed (509) and calculates the continuous latency of the touch controller as the elapsed time between the N-th image frame and the (N+K)-th image frame (510):

$$time_{elapsed} = \frac{K}{F},$$

wherein F is the recording frame rate of the image recorder. For example, if the image recorder frame rate is 1000 frames per second, the continuous latency would be calculated as K×0.001 seconds.

As mentioned earlier, the processing time of the touch detector may be substantially constant and less than 1/F, and thus, may be subtracted from the elapsed time calculated above to arrive at a more accurate measurement of the continuous latency:

$$time_{elapsed} = \frac{K}{F} - TD_p,$$

wherein $TD_p$ is the known or estimated processing time of the touch detector.

Accordingly, by correlating and taking the difference of the image frame numbers, the CVU is able to measure the continuous latency of the touch controller as the elapsed time between the image frame in which the input changed direction and the image frame in which the visual indicator is updated.

In overview, exemplary embodiments of the present system and method measure continuous latency by using a touch detector to update the state of a visual indicator and using computer vision to match key events between a touch input on a touch screen display and the visual state of the visual indicator. In more detail, according to an exemplary embodiment, as a user moves an input device on or over the touch screen display, an image recorder captures image frames of the touch screen display and the visual indicator simultaneously in each frame. At the same time, the touch controller outputs touch reports corresponding to those touch events.

Using tracking algorithms, a CVU tracks the tip of the touch input device in each image frame. When the user has made a change in input (e.g., by changing the direction of contact point movement by >90 degrees), the CVU identifies the frame number of the image frame in which the change in input is depicted. The CVU then identifies the frame number of the image frame in which the visual state of the visual indicator changed due to the touch detector detecting the change in input.

By comparing the frame number of the image frame in which the change in input is detected and the frame number of the image frame in which the change in the visual state of the visual indicator is detected, the CVU may calculate the time it takes the touch controller to respond to continuous touch inputs, i.e., the continuous latency.

The computer vision unit (CVU) may be implemented as a combination of computer hardware including a processor and a memory with one or more computer program products, i.e., one or more "modules" of computer program instructions encoded on a computer-readable medium for execution by, or to control the operation of, data processing apparatus. The memory may include a computer-readable storage medium. Common forms of computer-readable storage media include, for example, a floppy disk, a flexible disk, a hard disk, magnetic tape, any other magnetic medium, a random access memory (RAM), a CD-ROM disk, digital video disc (DVD), and various forms of volatile memory, non-volatile memory that can be electrically erased and rewritten. Examples of such non-volatile memory include NAND flash and NOR flash and any other optical or magnetic medium. The memory can also comprise various other memory technologies as they become available in the future.

The system further may include a mass storage device, portable storage medium drive(s), output devices, user input devices, a graphics display, and peripheral devices. The components may be connected via a single bus. Alternatively, the components may be connected via multiple buses. The components may be connected through one or more data transport means. Processor unit and main memory may be connected via a local microprocessor bus, and the mass storage device, peripheral device(s), portable storage device, and display system may be connected via one or more input/output (I/O) buses. Mass storage device, which may be implemented with a magnetic disk drive or an optical disk drive, may be a non-volatile storage device for storing data and instructions for use by the processor unit. Mass storage device may store the system software for implementing various embodiments of the disclosed systems and methods for purposes of loading that software into the main memory. Portable storage devices may operate in conjunction with a portable non-volatile storage medium, such as a floppy disk, compact disk or Digital video disc, to input and output data and code to and from the computing system. The system software for implementing various embodiments of the systems and methods disclosed herein may be stored on such a portable medium and input to the computing system via the portable storage device.

Peripherals may include any type of computer support device to add additional functionality to the computing system. Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, tablets, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, and other suitable operating systems. Due to the ever changing nature of computers and networks, the description of the computing system is intended only as a specific example for purposes of describing embodiments. Many other configurations of the computing system are possible having more or less components.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

The present system and method may be carried out in other specific ways than those herein set forth without departing from the scope and essential characteristics of the invention. The various features of the representative examples and the dependent claims may be combined in ways that are not specifically and explicitly enumerated in order to provide additional embodiments of the present teachings. The present embodiments are, therefore, to be considered in all respects as illustrative and not restrictive, and all changes coming within the meaning and equivalency range of the appended claims and above disclosure are intended to be embraced therein.

What is claimed is:

1. A method of measuring a continuous latency of a touch controller connected to a touch screen display, the method comprising:
   detecting touch reports from the touch controller and generating a detection signal in response to a change in input direction indicated by the touch reports;
   capturing a sequence of image frames, each image frame depicting a contact point on the touch screen display and depicting the detection signal outside the touch screen display; and
   determining a difference between a time $t_0$ when an actual change in input direction occurred and a time $t_1$ when the detection signal is generated, based on the image frames,
   wherein the detection signal is generated by a visual indicator that is not comprised by the touch screen display.

2. The method of claim 1 further comprising determining the time $t_0$ based on movement of the contact point on the touch screen display in the image frames.

3. The method of claim 2, wherein the detection signal is a visual signal.

4. The method of claim 1 wherein determining the difference comprises:
   recording the time $t_0$ based on visual observation of the contact point on the touch screen display, wherein the touch screen display has a predetermined frame rate;
   recording the time $t_1$ based on generation of the detection signal, wherein the detection signal is a visual signal; and
   counting a number of image frames between the time $t_0$ and the time $t_1$.

5. The method of claim 4, wherein counting the number of frames comprises:
   visually recording a movement of the contact point on the touch screen display;
   identifying a position of the contact point in each of an N-th image frame, an (N−1)-th image frame, and an (N−2)-th image frame, N being a natural number,
   calculating a first directional vector corresponding to a change in position of the contact point between the N-th image frame and the (N−1)-th image frame,
   calculating a second directional vector corresponding to a change in position of the contact point between the (N−1)-th image frame and the (N−2)-th image frame,
   determining that an angle formed by the first and second directional vectors exceeds a predetermined threshold value, and
   identifying the N-th image frame as the image frame in which the contact changed direction.

6. The method of claim 5, further comprising identifying an image frame in which the visual signal is generated, comprising:

determining a first visual state of the visual indicator in an (N+K−1)-th image frame, K being a natural number, determining a second visual state of the visual indicator in an (N+K)-th image frame, detecting that the first visual state differs from the second visual state, and identifying the (N+K)-th image frame as the image frame in which the visual indicator is updated.

7. The method of claim 6, wherein the continuous latency is equal to:

$$\frac{K}{F} - TD_p,$$

wherein $TD_p$ is a constant latency and F is the image capture frame rate.

8. The method of claim 7, wherein:

$$TD_p < \frac{1}{F}.$$

9. The method of claim 7, wherein F is equal to or greater than 1000 frames per second.

10. The method of claim 5, wherein the predetermined threshold value is 90 degrees.

11. The method of claim 5, wherein the predetermined threshold value is 45 degrees.

12. The method of claim 4, wherein identifying a position of the input includes tracking a pattern marker corresponding to an input device.

13. The method of claim 1, wherein determining the difference between the time $t_0$ and the time $t_1$ comprises:

identifying a first image frame in which the contact point changed direction;

identifying a second image frame in which the detection signal is generated; and calculating the time that elapsed between the first image frame and the second image frame.

14. An apparatus for measuring a continuous latency of a touch controller connected to a touch screen display, the apparatus comprising:

a touch detector unit coupled to the touch controller and configured to generate a detection signal in response to a change of input direction of a contact point on the touch screen display, the change of input direction indicated by touch reports output by the touch controller; and a measurement unit configured to capture a sequence of image frames, each image frame depicting a position of a contact point on the touch screen display and depicting the detection signal outside the touch screen display, the measurement unit further determining a difference between a time $t_0$ when an actual change in input direction occurred and a time $t_1$ when the detection signal is generated, wherein the detection signal is generated by a visual indicator that is not comprised by the touch screen display.

15. The apparatus of claim 14, wherein the measurement unit comprises an image recorder that records movement of the contact point on the touch screen display for determination of the time $t_0$.

16. The apparatus of claim 14, wherein the detection signal is a visual signal.

17. The apparatus of claim 16, wherein the visual indicator comprises a light emitting diode (LED).

18. The apparatus of claim 14, wherein the measurement unit comprises a computer vision unit configured to calculate the difference on the basis of image frames.

19. A method of measuring a continuous latency of a touch controller connected to a touch screen display, the method comprising:

receiving touch reports from the touch controller and generating a detection signal in response to a change of input direction indicated by the touch reports;

capturing a sequence of image frames, each image frame including position of a contact point on the touch screen display and depicting the detection signal outside the touch screen display; and counting the number of frames between a first frame depicting change in the position of a contact point and a second frame indicating an updated state of the detection signal, wherein the detection signal is generated by a visual indicator that is not comprised by the touch screen display.

20. The method of claim 19 further comprising determining the first frame by:

identifying a position of the contact point in each of an N-th image frame, an (N−1)-th image frame, and an (N−2)-th image frame, N being a natural number, calculating a first directional vector corresponding to a change in position of the contact point between an N-th image frame and an (N−1)-th image frame, calculating a second directional vector corresponding to a change in position of the contact point between the (N−1)-th image frame and an (N−2)-th image frame, determining that an angle formed by the first and second directional vectors exceeds a predetermined threshold value, and identifying the N-th image frame as the image frame in which the contact point changed direction.

* * * * *